Nov. 19, 1963  B. T. ANDREN ETAL  3,111,309
LEAF SPRING MOUNTING
Filed July 13, 1960

FREDERICK J. HOOVEN
BERTIL T. ANDREN
INVENTORS

BY John R. Faulkner
Clifford L. Nadler

ATTORNEYS

United States Patent Office 3,111,309
Patented Nov. 19, 1963

3,111,309
LEAF SPRING MOUNTING
Bertil T. Andren, Dearborn, and Frederick J. Hooven, Bloomfield Hills, Mich., assignors to Ford Motor Company, Dearborn, Mich., a corporation of Delaware
Filed July 13, 1960, Ser. No. 42,562
7 Claims. (Cl. 267—52)

The present invention relates to vehicle suspension systems and more particularly to a device for securing an axle housing to leaf type suspension springs.

In a motor vehicle having longitudinally extending leaf members acting as suspension springs, it has heretofore been common practice to secure the axle housing rigidly to a central portion of the springs. This arrangement has the disadvantage that shocks and vibrations occurring when the wheels strike minor obstacles in the road are transmitted directly through the axle to the springs. As the springs are attached more or less rigidly to the vehicle body, these objectionable shocks and vibrations are also transmitted to the passenger compartment of the vehicle body resulting in what is known as ride harshness.

In accordance with the present invention, means are provided to permit limited relative movement between the axle housing and the leaf springs. More specifically, this invention provides a pivoted double tension shackle connection between the leaf springs and the axle housing so that when one of the wheels carried by the axle strikes an object in the road a small amount of longitudinal movement will be permitted between the axle and the springs. Such action absorbs some of the road shock as the wheels "give" on impact and is sometimes referred to as wheel compliance.

In the preferred embodiment, a rear axle assembly is connected to a clamping device for the rear leaf springs of a vehicle by sets of tension type shackles. The shackles being in tension provide a load restriction to movement of the axle except when the wheels encounter a bump and then, fore and aft movement of the shackles absorbs the forces. The result is a reduction of harshness and transmission of axle noises.

Further objects and advantages of this invention will be more fully comprehended from the following description and the accompanying drawings, in which.

Figure 1:
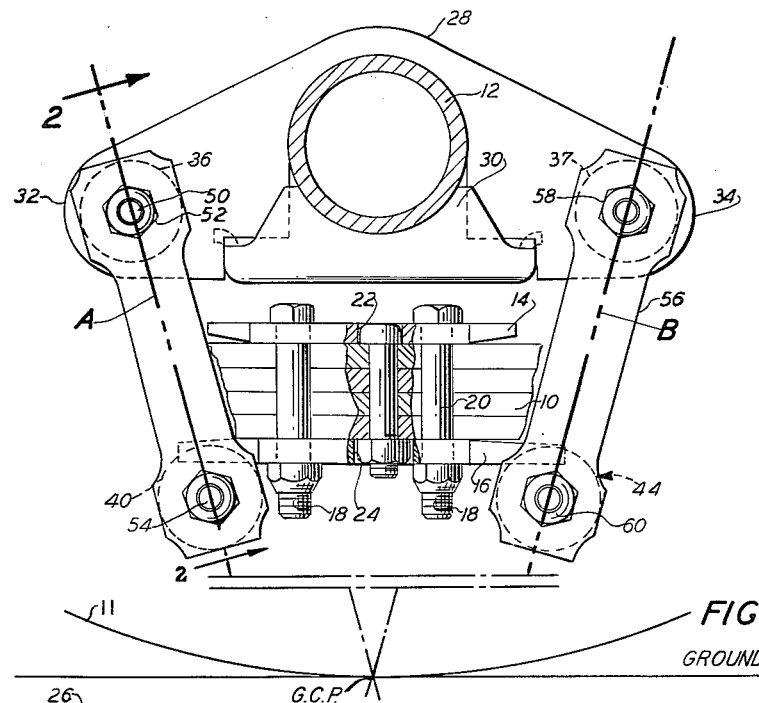
FIGURE 1 is a side elevational view partly in section of the axle housing to leaf spring connection.
Figure 2:
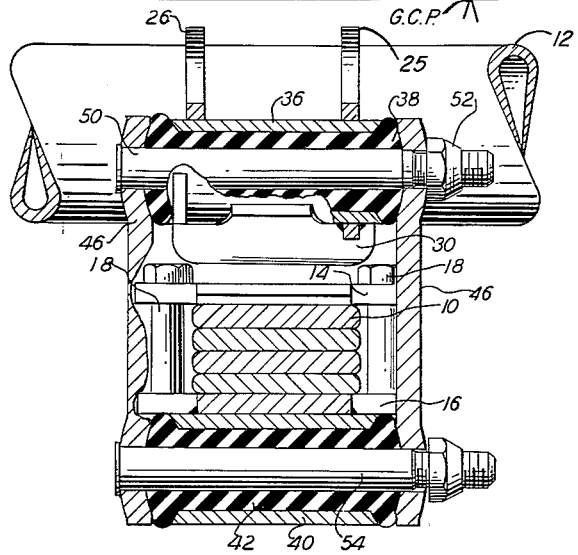
FIGURE 2 is a rear elevational view partly in section taken along section lines 2—2 of FIGURE 1.

Referring now to the drawings where the preferred embodiment of the present invention is shown, a plurality of longitudinally extending leaf springs 10 are disclosed. The springs 10 are to be located adjacent the vehicle's rear wheels 11. The wheels 11 are connected to a driving axle that is journalled within a tube-like axle housing 12.

The elongated leaves forming the spring 10 are connected between upper and lower clamping plate 14 and 16. A set of four bolts 18 secures the plates 14, 16 about the spring 10.

A fifth bolt 20 passes through a series of vertically aligned holes in the leaves of the spring 10 in order to position the leaves during the assembly of the plates 14 and 16. Openings 22 and 24 are counterbored in the plates 14 and 16 to receive the head and nut of the pilot bolt 20.

A pair of vertical plate members 26 and 28 are welded to the tube 12 parallel to the longitudinal axis of the spring 10. They are positioned relative to the tube 12 by a lower bracket 30 that is also welded in place.

The plates 26, 28 are elongated members having forwardly and rearwardly extending ends 32 and 34. A bushing retainer tube 36 is welded to the forward end 32 of the plates 26, 28. A cylindrical rubber bushing member 38 is positioned within the tube 36. A similar bushing retainer tube 37 is secured at the rearward end 34 of the plates 26, 28.

The forward end of the lower clamping plate 16 has a tube 40 welded thereto that contains a rubber bushing 42 of cylindrical shape. Similarly, a rubber bushing assembly 44 is secured to the rearward end of the lower plate 16.

A pair of depending tension shackles 46 are pivotally secured to the upper bushing 38 by a bolt and nut combination 50, 52. The lower end of the shackles 46 is secured to the forward bushing 42 by a bolt 54 in a like manner. The upper and lower rear bushings 37 and 44 are linked together by a pair of shackles 56. Upper and lower bolts 58 and 60 pass through the bushings 37 and 44 to complete the connection.

When wheel 11 that is journalled in the axle housing 12 strikes an object, forces will be created tending to move the housing upwardly and rearwardly. These forces will tend to rotate the shackles in a clockwise direction about the bolts 50, 54, 48, and 60. This movement will absorb the road shock. In addition, the rubber bushings that surround the pivot bolts will also dampen vibrations.

It will be noted in FIGURE 1 that the spacing of the lower bushings 40 and 44 is less than the distance between the upper pivot bushings 36 and 37. More specifically, a line A connecting the centers of the forward bushings at 36 and 40 is inclined relative to a line B passing through the centers of the bushings 37 and 44, so that the two center lines A and B intersect at or near the ground contact point (G. C. P.) of the road wheel 11 when viewed in side elevation. The imaginary point of intersection of the axes A and B of the shackles 46 and 56 is commonly referred to as their instantaneous center. Lines A and B, which pass through the pivot centers of bushings 36, 40 and 37, 44, respectively, may be considered the longitudinal axes of the shackles 46 and 56.

Due to the fact that the forward shackles 46 and rear shackles 56 are inclined and under tension considerable centering forces are exerted to stabilize the device but still permit the desired fore and aft movement upon wheel impact with a road obstacle. Further, the specific geometry of the shackles, that is, having their axes inclined to intersect near the ground contact point of the wheel, provides that there will be practically no fore and aft movement from braking or acceleration forces.

The foregoing description constitutes the preferred embodiment of the present invention. However, those skilled in the art may conceive modifications and alterations which will come within the scope and spirit of the appended claims.

We claim:
1. A suspension device for connecting an axle housing to a spring comprising a pair of fore and aft elastic bushings secured to said housing, fore and aft spaced apart elastic bushings secured beneath and to said spring, sets of fore and aft tension shackles interconnecting said fore and aft bushings, the bushings of said axle housing having a greater spacing than the bushings of said spring, said bushings having their pivot axes positioned to permit fore and aft relative movement between said housing and said spring.

2. A suspension device for connecting an axle housing to leaf springs comprising a pair of fore and aft elastic bushings secured to said housing, fore and aft spaced apart elastic bushings secured beneath and to said springs, sets of fore and aft tension shackles interconnecting said fore and aft bushings, said shackles having their longitudinal axes intersecting, said bushings having their axes positioned to permit fore and aft relative movement between said housing and said spring.

3. A suspension device for connecting an axle housing to leaf springs comprising a road wheel rotatably mounted relative to said housing, a pair of fore and aft elastic bushings secured to said housing, fore and aft spaced apart elastic bushings secured beneath and to said springs, sets of fore and aft tension shackles interconnecting said fore and aft bushings, said shackles having their longitudinal axes intersect at a point near the ground contact point of said wheel when the device is viewed in side elevation, said bushings having their pivot axes positioned to permit fore and aft relative movement between said housing and said spring.

4. In a motor vehicle having sprung and unsprung components, suspension means interconnecting said components and adapted to permit controlled vertical and horizontal movement of said unsprung component relative to said sprung components, said unsprung components including a road wheel and wheel support structure, said means comprising a first member connected to said sprung components and having a portion adapted to traverse a jounce and rebound path, a pair of means each interconnecting said portion and said wheel support structure and adapted to permit relative longitudinal movement therebetween, said pair of means having an instantaneous effective center under static conditions at approximately the road engaging point of said wheel when viewed in side elevation.

5. In a motor vehicle having sprung and unsprung components, suspension means interconnecting said components and adapted to permit controlled vertical and horizontal movement of said unsprung component relative to said sprung components, said unsprung components including a road wheel and wheel support structure, said means comprising a first member connected to said sprung components and having a portion adapted to traverse a jounce and rebound path, link means pivotally interconnecting said portion and said wheel support structure and adapted to permit relative longitudinal movement between said portion and said structure, said link means having an instantaneous center at approximately the road engaging point of said wheel when viewed in side elevation.

6. In a motor vehicle having sprung and unsprung components, suspension means interconnecting said components and adapted to permit controlled vertical and horizontal movement of said unsprung component relative to said sprung components, said means comprising a first member connected to said sprung components and having a portion adapted to traverse a jounce and rebound path, links interconnecting said portion and said unsprung component, said links being pivotally connected to said unsprung component and to said portion by means having transverse pivot axes, said links being normally loaded in tension and inclined to the vertical so as to have a greater spacing between their upper ends than between their lower ends.

7. In a motor vehicle having sprung and unsprung components, suspension means interconnecting said components and adapted to permit controlled vertical and horizontal movement of said unsprung component relative to said sprung components, said unsprung components including a road wheel and wheel support structure, said means comprising a first member connected to said sprung components and having a portion adapted to traverse a jounce and rebound path, fixed length links pivotally interconnecting said portion and said wheel support structure and adapted to permit relative longitudinal movement therebetween, said links being inclined to each other and having an instantaneous center at approximately the road engaging point of said wheel when viewed in side elevation.

References Cited in the file of this patent

UNITED STATES PATENTS

| 2,216,455 | Piron | Oct. 1, 1940 |
| 2,274,518 | Baker | Feb. 24, 1942 |
| 2,309,812 | Utz | Feb. 2, 1943 |
| 2,507,424 | Stull | May 9, 1950 |

FOREIGN PATENTS

| 44,066 | France | July 23, 1934 |
| 534,022 | France | Dec. 26, 1921 |
| 9,320 | Great Britain | of 1893 |
| 665,282 | Great Britain | Jan. 23, 1952 |